US006648517B2

United States Patent
Ishiwada et al.

(10) Patent No.: US 6,648,517 B2
(45) Date of Patent: Nov. 18, 2003

(54) RETAINER FOR ROLLING BEARING

(75) Inventors: Hiroshi Ishiwada, Kanagawa (JP); Yasushi Mutoh, Kanagawa (JP); Banda Noda, Kanagawa (JP); Tatsunobu Momono, Kanagawa (JP); Magozou Hamamoto, Kanagawa (JP); Yasuhisa Terada, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/000,218

(22) Filed: Dec. 4, 2001

(65) Prior Publication Data
US 2003/0103703 A1 Jun. 5, 2003

(51) Int. Cl.[7] .............................................. F16C 33/41
(52) U.S. Cl. ....................................... 384/531; 384/533
(58) Field of Search ................................ 384/523, 531, 384/532, 533

(56) References Cited

U.S. PATENT DOCUMENTS 4,493,513 A * 1/1985 Osawa et al. ............... 384/533
6,074,099 A * 6/2000 Mutou et al. ............... 384/533
6,273,615 B1 * 8/2001 Obara et al. ................ 384/523
6,276,836 B1 * 8/2001 Suzuki et al. ............... 384/531

FOREIGN PATENT DOCUMENTS

JP    7-208482    11/1995
JP    9-144762    6/1997

* cited by examiner

Primary Examiner—Thomas R. Hannon
(74) Attorney, Agent, or Firm—Sughrue Mion, PLLC

(57) ABSTRACT

The pocket surface of a pocket with a ball stored therein has a pair of first pocket surfaces respectively formed inside a pair of pawls and a second pocket surface situated between the two first pocket surfaces. The second pocket surface is formed as a spherical-shaped concave surface having a radius of curvature the center of curvature of which is the rotation center of the ball in a no-load state. Each of the first pocket surfaces has a center of curvature shifted from the center of curvature of the second pocket surface toward the opposite side to the entrance (opening) of the pocket by an axially shifting quantity $h_1$, and each of the first pocket surfaces is formed, starting from the present center of curvature, as a spherical-shaped concave surface with its radius of curvature set larger than the radius of curvature of the second pocket surface.

10 Claims, 7 Drawing Sheets

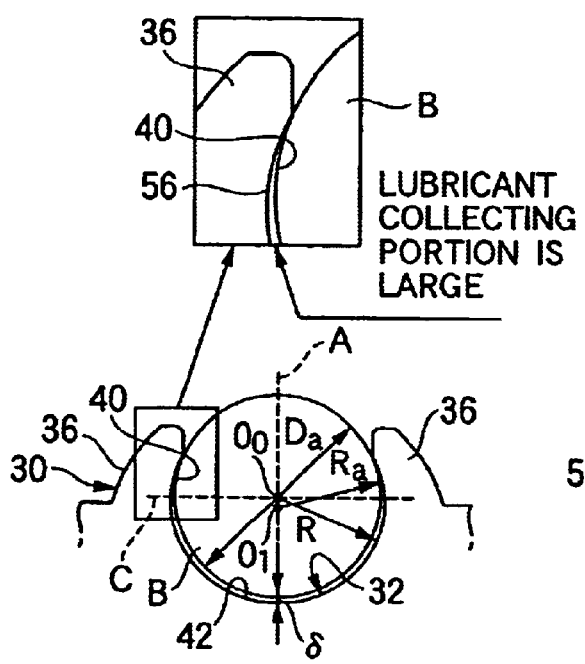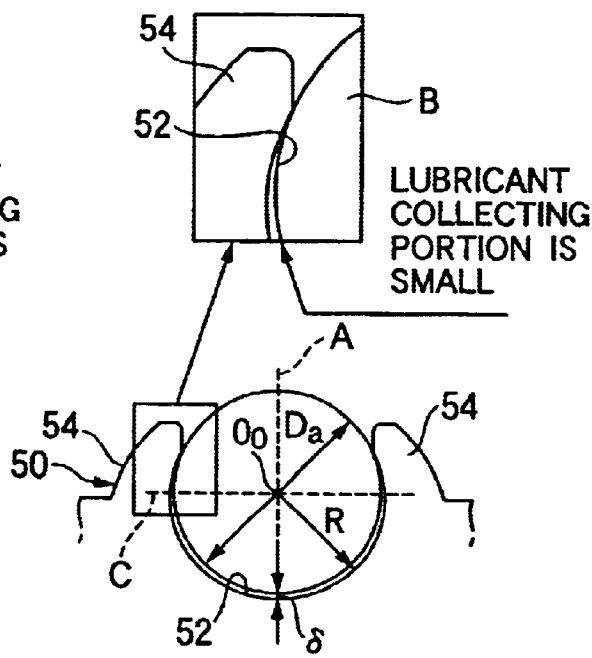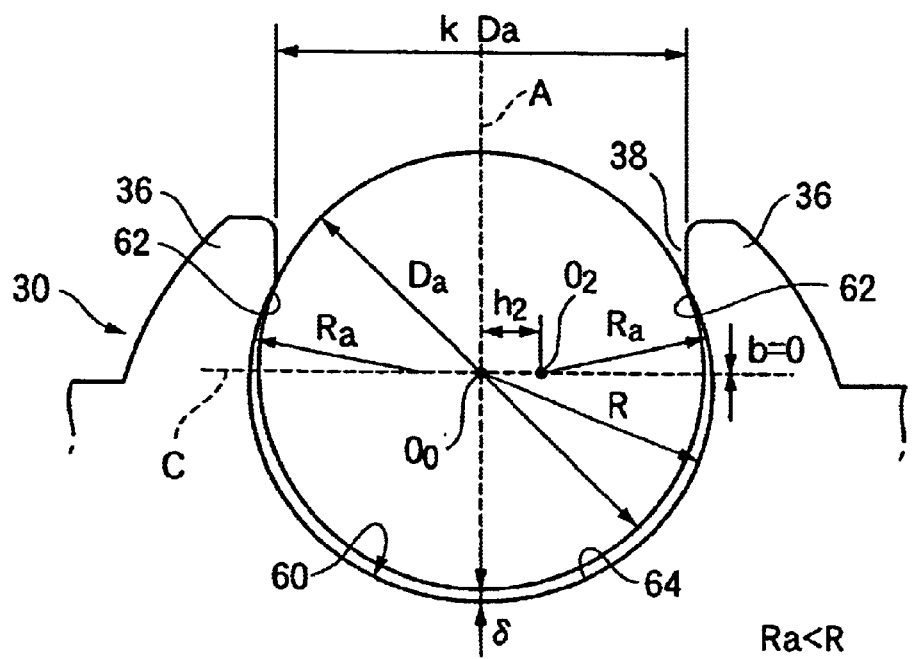

ANALYSIS RESULTS OF FREQUENCIES
OF NOISES IN BEARING

AXIAL CLEARANCE / BALL DIAMETER ($\delta$/Da)

NOISE LEVEL AND DYNAMIC TORQUE OF BEARING INCORPORATING RETAINER ACCORDING TO PRESENT EMBODIMENT, WHEN IN ROTATION.

RETAINER FOR ROLLING BEARING

BACKGROUND OF THE INVENTION

The present invention relates to a retainer for a rolling bearing such as a deep groove ball bearing used in a motor requiring low vibrations and low noises.

A deep groove ball bearing, which is used to support a bearing portion or a rotary portion in various rotary machines, comprises an inner ring having an inner ring raceway of a deep groove formed in the outer peripheral surface thereof, an outer ring disposed concentrically with the inner ring and having an outer ring raceway of a deep groove formed in the inner peripheral surface thereof, and a plurality of balls rollably interposed between the inner and outer rings. The respective balls are rollably held by a retainer, and lubricant such as grease and other kinds of lubricant oil are filled into a space between the outer peripheral surface of the inner ring and the inner peripheral surface of the outer ring, in such a manner that the inner and outer rings are allowed to rotate with respect to each other due to the rolling movements of the balls.

Here, as conventional examples of the above-mentioned retainer, there are known retainers which are disclosed in, for example, JP-A-9-144762 shown in FIG. 9 (which is hereinafter referred to as a prior application art 1), and JP-A-7-208482 shown in FIGS. 10 and 11 (which is hereinafter referred to as a prior application art 2).

Firstly, FIG. 9 shows a retainer 2 which is disclosed in the prior application art 1. This retainer is a crown-shaped member formed of, for example, synthetic resin by injection molding and comprises a plurality of pockets 4 formed in the proper positions thereof such as on the circumference thereof; and, on one side of the axial direction of each of the pockets 4, there is formed an annular-shaped base portion 6 and, on the other side of the pocket axial direction, there is formed an opening 8 set smaller than the diameter of a ball (not shown). The adjoining pockets 4 are separated by a pillar portion 10, a pair of elastically deformable pawls 12 respectively extend in an arc-shaped manner from the leading end of the pillar portion 10 and cooperate together in defining the opening 8, and the opening 8 is set smaller than the diameter of a ball (not shown). And, the peripheral edge of the pocket 4 is formed in a concave-shaped spherical surface and, on the leading-end-side area of each pocket 4, there is provided a projecting portion 12a. The projecting portion 12a has an arc-shaped section and is disposed along the width-direction curvature of the peripheral surface of the pocket 4. Due to provision of the projecting portion 12a, when a ball is stored in the pocket 4, the projecting portion 12a is elastically contacted with the ball, thereby restricting the self-oscillation of the ball.

Also, FIGS. 10 and 11 show a retainer 16 which is disclosed in the prior application art 2. In the case of the retainer 16, between a pair of pawls 19 disposed on one side X of the axial direction of the retainer 16, there are interposed a plurality of pockets 18 at proper positions such as on the circumference thereof having openings 18a, while the dimension of the opening width W of each of the openings 18a is set smaller than the diameter D of a ball 20.

Each pocket 18 includes two side wall surfaces 18b respectively disposed on the two sides of the circumferential direction thereof and a bottom wall surface 18c disposed opposed to the opening 18a of the pocket 187 and, the side wall surface 18 is formed as a concave-shaped spherical surface having a radius of curvature R1 the center of curvature of which is a point $O_1$, while the bottom wall surface 18c is formed as a flat surface extending at right angles to the axial direction of the pocket 18. The radius of curvature R1 of the side wall surface 18b is larger than the radius D/2 of the ball 20. And, the center $O_2$ of the ball 20 in the intermediate portion thereof (where the ball 20 is situated in the center of the pocket 18 and is contacted with neither the side wall surfaces 18b nor the bottom wall surface 18c) is shifted by a dimension S toward one side X of the axial direction of the pocket 18 from the center of curvature $O_1$ of the side wall surfaces 18b, and the ball 20 is shifted toward the opening 18a side. The retainer 16 can be moved from this shifted state by a dimension A toward the other side Y of the axial direction thereof and by a dimension B in the circumferential direction thereof until it is contacted with the ball 20 and, at the same time, can be moved by a dimension C toward one side X of the axial direction until the bottom wall surface 18c is contacted with the ball 20.

However, in the prior application art 1, in the process in which the retainer 2 is formed by injection molding, in a step of removing a metal mold, the projecting portion 12a interferes with the metal mold, which makes it difficult to manufacture the metal mold. Also, when storing the ball into the retainer 2, while pressure contacting the ball against the leading ends of the pair of pawls 12 disposed in the openings 8 to thereby spread out them elastically, the ball is stored from the opening 8 into the pocket 4. Such provision of the projecting portions 12a on the pair of pawls 12 reduces the dimension of the opening 8, thereby raising a fear that the pawls 12 can be damaged or broken when pressure contacting the ball 20 with the leading ends of the pair of pawls 12.

Also, in the prior application art 2, when the retainer 16 is moved toward one direction X of the axial direction in FIG. 11, there is eliminated a clearance for holding the lubricant held between the bottom wall surface 18c and ball 20 to thereby worse the lubricating state of the retainer 16, which increases sliding friction between the bottom wall surface 18c and ball 20. This raises a fear that the pawls 19 can be self-oscillated, which makes it impossible to reduce the noises of the retainer to a satisfactory degree, so that its improvement has been desired.

SUMMARY OF THE INVENTION

The present invention aims at eliminating the above-mentioned drawbacks found in the conventional retainers for a rolling bearing. Accordingly, it is an object of the invention to provide a retainer for a rolling bearing which is structured such that, in the leading end portions of the pawls defining the pocket, there are not provided the projecting portions having disadvantageously influences on the manufacture of a metal mold for injection molding the retainer and on the storing operation of the ball or rolling element into the retainer, and also which can restrict the axial-direction movement of the retainer with respect to the rolling element to thereby be able not only to prevent generation of noises in the retainer but also to enhance the lubricating property of the retainer.

In attaining the above object, according to the invention, there is provided a retainer for a rolling bearing, formed in a circular-ring shape as a whole, comprising: a plurality of pockets formed at a plurality of portions thereof in the circumferential direction thereof for storing and holding rolling elements with the pocket surfaces of the pockets; and, a plurality of openings respectively formed on one side of the axial direction of the respective pockets, each of the openings having an opening width set smaller than the diameter of the rolling element, wherein the ratio of an axial clearance δ, which is formed between the rolling surface of the rolling element in the above axial direction and the pocket surface, to the diameter Da of the rolling element is set in the range of δ/Da=−0.01~0.02 (i.e., δ/Da is in the range between −0.01 and 0.02).

In case where the value of δ/Da exceeds 0.02, when the retainer is going to move in the axial direction with respect to the rolling element, there is a fear that the axial clearance δ increases excessively to cause the rolling element to be collided with the inside pocket surface of the opening and the pocket surface of the bottom portion of the pocket with a large force, thereby increasing the noise level. On the other hand, in case where the value of δ/Da is smaller than −0.01, the axial clearance δ between the rolling surface of the rolling element and the pocket surface decreases, thereby raising a fear that the dynamic torque can be increased suddenly.

However, as in the present invention, in case where the ratio of an axial clearance δ, to the diameter Da of the rolling element is set in the range of δ/Da=−0.01~0.02, the inside pocket surface of the opening and the pocket surface of the bottom portion of the pocket restrict the movement of the retainer in the axial direction thereof to thereby be able not only to reduce the collision force between the rolling element and the pocket surfaces of the retainer but also to obtain a sufficiently large lubricant collecting portion, which can prevent an increase in the dynamic torque and noise level.

Also, in case where the pocket surface comprises a pair of first pocket surfaces respectively formed inside the opening and a second pocket surface formed between the two first pocket surfaces, and the center of the radius of curvature of the first pocket surface is shifted in the axial direction or in the circumferential direction with respect to the center of the radius of curvature of the second pocket surface substantially coincident with the rotation center of the rolling element, when the rolling element is contacted with the inner walls of the opening, there is formed a relatively large lubricant collecting portion in the circumferential direction between the rolling element and first pocket surfaces, so that not only the above-mentioned dynamic torque and noise level can be prevented from increasing but also the lubricant can be made easy to flow into the pocket and to be held therein.

Specifically, in case where the radius of curvature of the first pocket surface is set at a value larger than the radius of curvature of the second pocket surface, the center of curvature of the radius of curvature of the first pocket surface is shifted from the center of curvature of the radius of curvature of the second pocket surface toward the opposite side to the opening in the axial direction, and the inflection point heights of the first and second pocket surfaces are set so as to coincide with each other, there can be formed a relatively large lubricant collecting portion in the circumferential direction of the retainer.

Also, in case where the radius of curvature of the first pocket surface is set at a value smaller than the radius of curvature of the second pocket surface, the center of curvature of the radius of curvature of the first pocket surface is shifted in the circumferential direction with respect to the center of curvature of the radius of curvature of the second pocket surface, and the inflection point heights of the first and second pocket surfaces are set so as to coincide with each other, the manner of embracing the rolling element by the pocket surface on the opening side can be set freely.

Further, in case where the radius of curvature of the first pocket surface is set at a value equal to the radius of curvature of the second pocket surface, the center of curvature of the radius of curvature of the first pocket surface is shifted from the center of curvature of the radius of curvature of the second pocket surface toward the opposite side to the opening in the axial direction, and the inflection point heights of the first and second pocket surfaces are set so as to coincide with each other, when designing a metal mold for forming the retainer by injection molding, the origin can be determined simply, thereby being able to facilitate the manufacture of the metal mold.

BRIEF DESCRIPTION OF THE DRAWINGS

FIGS. 3(a) and (b) are views for comparison of the pocket according to the first embodiment of the invention, FIG. 3(a), with a conventional pocket as shown in FIG. 3(b) with its pocket surface formed as a single spherical surface, showing the collecting states of lubricant in the respective pockets.

FIG. 4 is a view of the shape of a pocket used in a second embodiment according to the invention.

DETAILED DESCRIPTION OF THE PREFERRED EMBODIMENTS

Now, description will be given below of the preferred embodiments of a retainer according to the invention with reference to the accompanying drawings.

Figure 1:
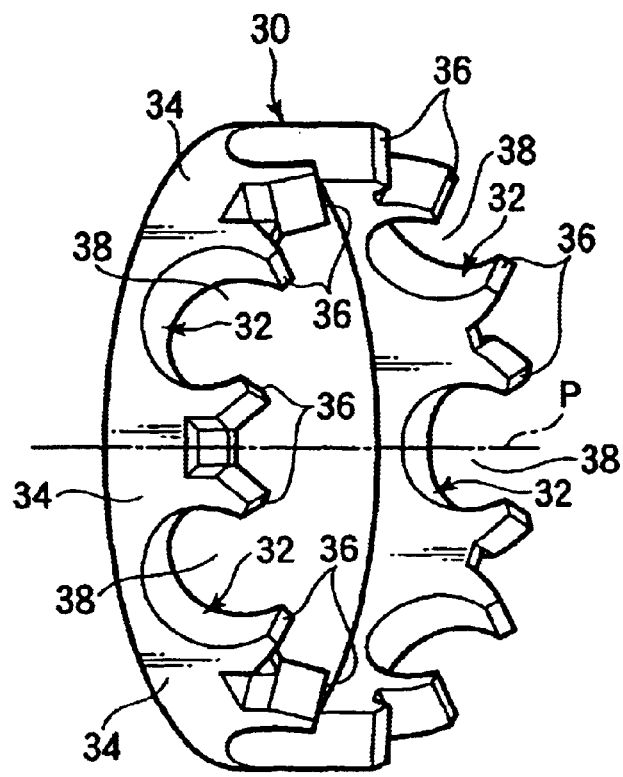
FIG. 1 is a perspective view of a retainer for a rolling bearing according to the invention.

FIG. 1 shows a retainer 30 according to a first embodiment of the invention. This retainer 30 is a crown-shaped member which is formed of synthetic resin by injection molding and, on one side of the axial direction P of the retainer 30, there are formed a plurality of pockets 32 at given intervals in the circumferential direction of the retainer 30. The mutually adjoining ones of the respective pockets 32 are separated by their associated pillar portions 34 and, between a pair of pawls 36 each extending in an arc-like shape from the leading ends of each of the pillar portions 34, there is opened a pocket opening 38.

Figure 2:
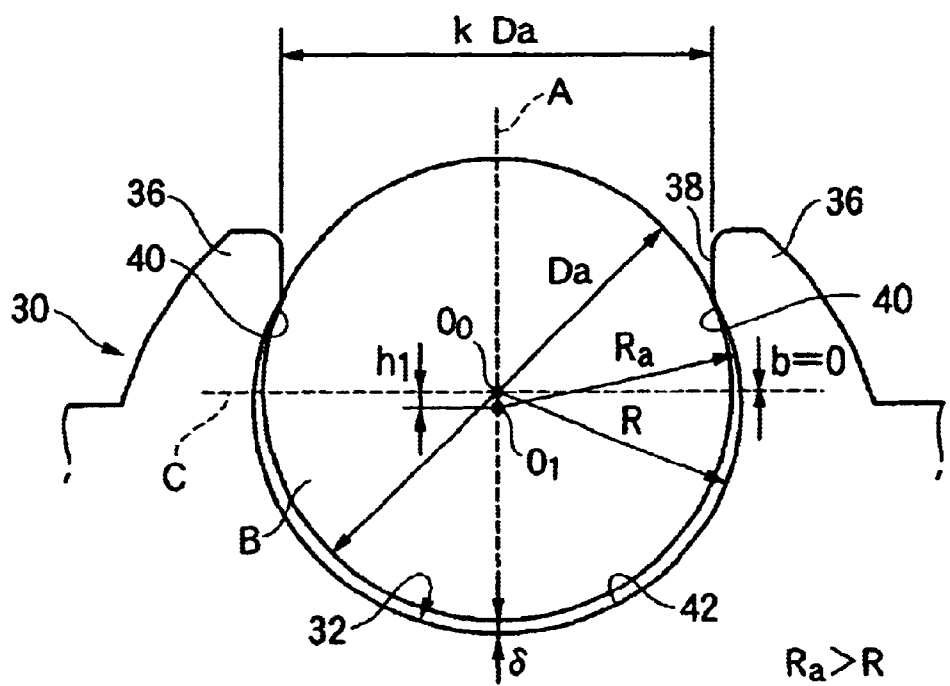
FIG. 2 is a view of the shape of a pocket used in the first embodiment of the invention.

Now, FIG. 2 shows a state in which the retainer 30 shown in FIG. 1 stores and holds a ball B in the pocket 32 in a no-load condition. Here, a broken line A extending in the vertical direction in FIG. 2 is referred to as an axial direction which extends along the axial direction P of the retainer 30, whereas a broken line C extending in the right and left direction in FIG. 2 is referred to as a circumferential direction. Also, a clearance, which is formed between the outer peripheral surface of the ball B and the pocket surface of the pocket 32 in the axial direction A, is referred to as an axial clearance δ. Further, the diameter of the ball B is set as a dimension Da, while the opening width of the pocket interposed between the pair of pawls 36 is set as a dimension kDa. Here, a constant k for determining the opening width of the pocket opening 38 is set as a known value, for example, in the range of k=0.85~0.95 and, by using the constant k of a given value, the opening width of the pocket opening 38 is set smaller than the diameter Da of the ball B.

And, the pocket surface of the pocket 32 with the ball B stored therein is composed of a pair of first pocket surfaces 40 respectively formed in the inner walls of the pair of pawls 36 and a second pocket surface 42 interposed between the two first pocket surfaces 40.

The second pocket surface 42 is formed as a spherical-shaped concave surface having a radius of curvature R which is shown in the following equation (1) and has, as a center of curvature thereof, the center of rotation $O_0$ of the ball B in the no-load condition.

$$R = \delta + Da/2 \tag{1}$$

Also, each of the first pocket surfaces 40 is formed as a spherical-shaped concave surface the center of curvature $O_1$ of which is shifted from the center of rotation $O_0$ of the second pocket surface 42 toward the opposite side to the pocket opening 38 in the axial direction A by a dimension $h_1$ (which is hereinafter referred to as an axial shifting quantity $h_1$), and also which has a radius of curvature Ra larger than the radius of curvature R of the second pocket surface 42 from the center of curvature $O_1$ (Ra>R) By the way, the above-mentioned axial shifting quantity $h_1$ and radius of curvature Ra of the first pocket surface 40 are shown in the following equations (2) and (3), respectively.

$$h_1 = \frac{\delta(\delta + Da)}{Da\sqrt{1 - K^2}} \neq 0 \tag{2}$$

$$Ra = \sqrt{\left(\delta + \frac{Da}{2}\right)^2 + \left\{\frac{\delta(\delta + Da)}{Da\sqrt{1 - K^2}}\right\}^2} \tag{3}$$

Figure 7:
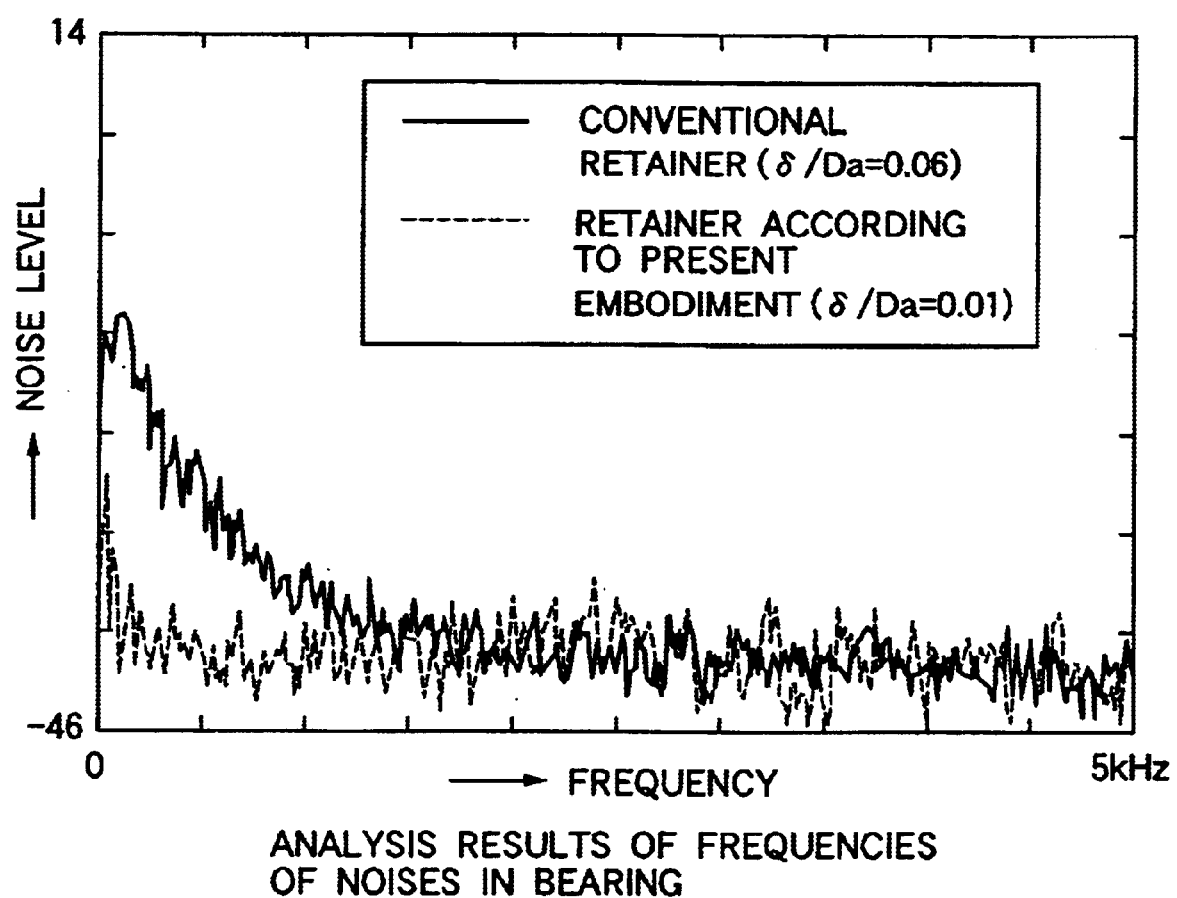
FIG. 7 is a graphical representation of comparison between a bearing incorporating therein a retainer according to the invention and a bearing incorporating therein a conventional retainer.

Here, as can be seen clearly from the above equations (1), (2) and (3), in the case of a retainer 30 according to the present embodiment, the radius of curvature Ra of the first pocket surface 40, radius of curvature R of the second pocket surface 42, and axial shifting quantity $h_1$ are set using the axial clearance δ, diameter Da of the ball B and constant k (k=0.85~0.95) However, in case where the axial clearance δ, and the diameter Da of the ball B are not set for optimum values, there is a fear that, as shown in FIG. 7, the dynamic torque can increase suddenly and/or the noise level can increase.

That is, FIG. 7 shows the compared results of the frequencies of the noises generated in a deep groove ball bearing incorporating therein a conventional retainer having a ratio of the axial clearance δ to the diameter Da of the ball B set as δ/Da=0.06 and in a deep groove ball bearing incorporating therein a retainer 30 according to the present embodiment set as δ/Da=0.01. According to these results, the frequency band of the deep groove ball bearing incorporating therein a retainer 30 according to the present embodiment (δ/Da=0.01) is 2 kHz or less and the noise level of the deep groove ball bearing incorporating therein a retainer 30 is lower than that of the conventional retainer (δ/Da=0.06). This is because, in the case of the conventional retainer, the moving quantity in the axial direction A of the retainer with respect to the ball increases and thus the pocket surfaces and pawls are collided with the ball with a large force to thereby raise the noise level.

Figure 8:
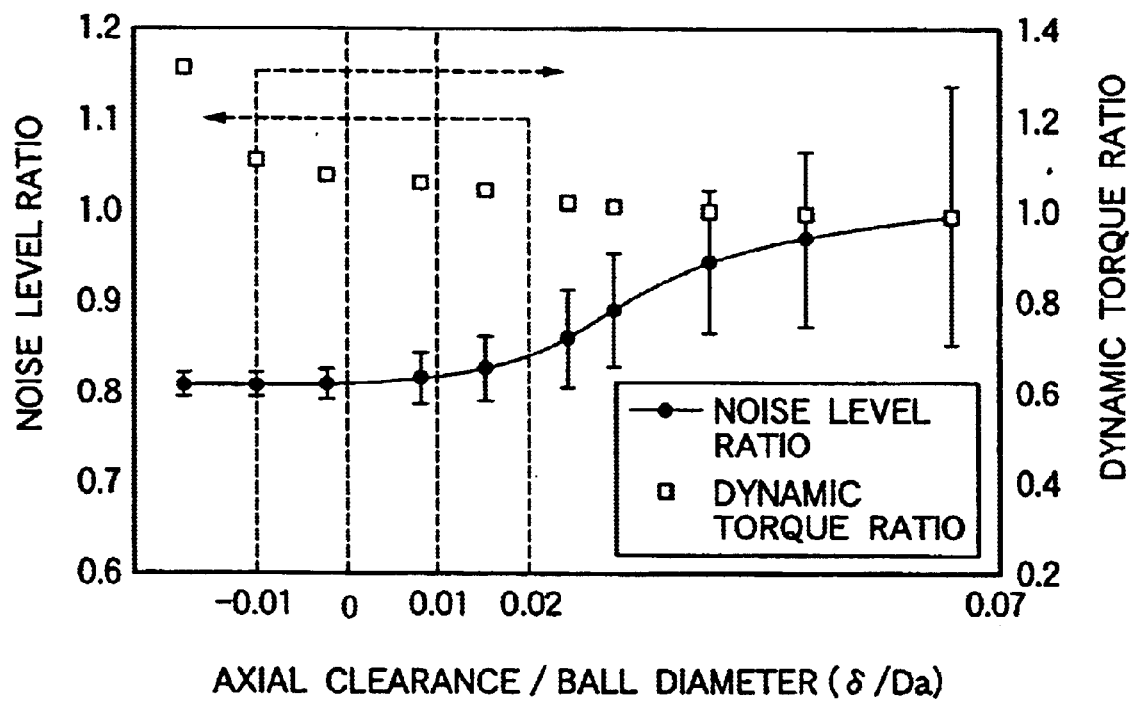
FIG. 8 is a graphical representation of variations in the noise level and dynamic torque when a ratio of an axial clearance δ to a rolling element diameter Da (δ/Da) is varied.
Figure 9:
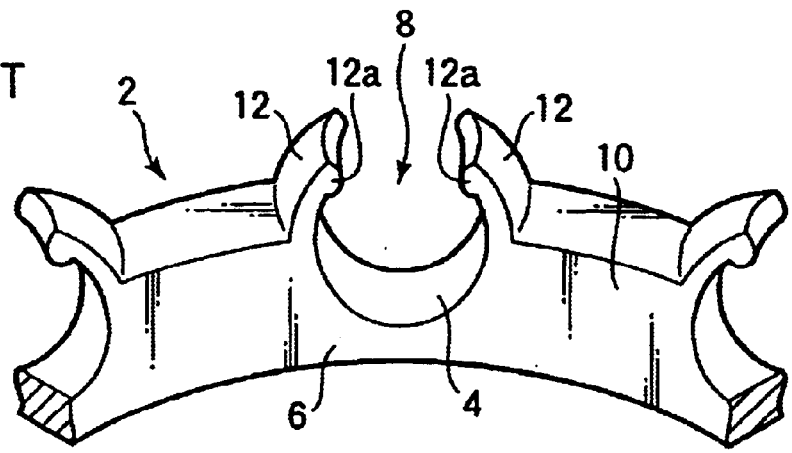
FIG. 9 is a perspective view of a first conventional retainer.
Figure 10:
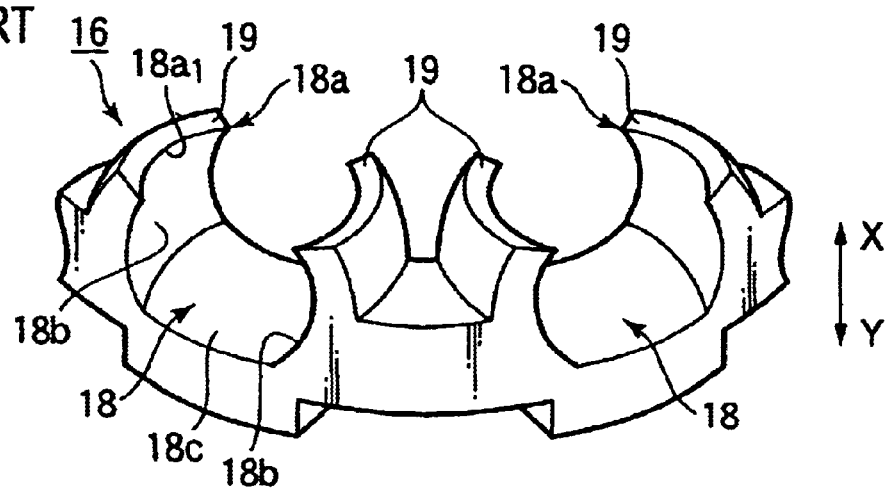
FIG. 10 is a perspective view of a second conventional retainer.
Figure 11:
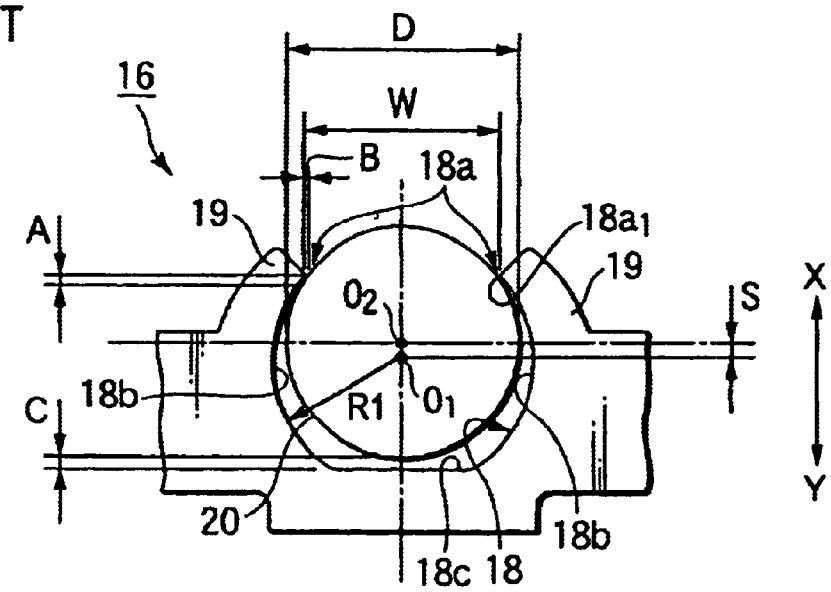
FIG. 11 is a view of a pocket structure used in the second conventional retainer.

Also, FIG. 8 shows the experimental results of ratios obtained when a retainer according to the present embodiment with the ratio of δ/Da varied was incorporated into a bearing, with the noise level and dynamic torque of a bearing incorporating therein the conventional retainer respectively set for 1. By the way, in this experiment, a deep groove ball bearing having an outside diameter of 26 mm, an inside diameter of 10 mm and a width of 8 mm was used, the inner ring of the deep groove ball bearing was rotated at 4000 rpm with a preload of 2 kgf applied, and the noises generated with the rotation of the inner ring were measured. Also, as the lubricant, there was used ester-system synthetic oil. Further, as the inner and outer rings of the deep groove ball bearing tested, there were used the same races and, as the retainer only, there were switchingly used a retainer according to the present embodiment and the conventional retainer.

The results shown in FIG. 8 tells that, in case where the ratio of the axial clearance δ to the diameter Da of the ball B, that is, δ/Da is small, the noise level is low and variations in the noise level are also small. Especially, in the case of δ/Da of 0.02 or less, an effect on the acoustic characteristic is outstandingly large.

Also, in order to attach much importance to the acoustic characteristic, it is possible to set the axial clearance δ smaller than 0 (zero) (δ is a negative value). However, in this case, the dynamic torque increases to thereby have ill effects on the heat generation and durability of the retainer. Also, the lubricant collecting portion is reduced in size to thereby increase the dynamic torque suddenly. Therefore, for the lower limit value of the ratio, δ/Da=−0.01 is the optimum.

As described above, according to the present embodiment, in case where the ratio of the axial clearance δ to the diameter Da of the ball B, that is, δ/Da is set in the range of δ/Da=−0.01~0.02, when the retainer 30 is going to move in the axial direction with respect to the ball B, not only the first pocket surfaces 40 formed in the inner walls of the pair of pawls 36 and the second pocket surface 42 situated between the first pocket surfaces 50 restrict the movement of the retainer 30 to thereby reduce a collision force between the ball B and pocket surfaces 40, 42, but also a sufficient lubricant collecting portion can be obtained positively. This can reduce the dynamic torque and also can restrict the noise level.

Next, description will be given below of the lubricant collecting states of the retainer 30 according to the present embodiment and a conventional retainer with reference to FIGS. 3 (a), (b). By the way, the conventional retainer 50 is structured such that, as shown in FIG. 3 (b), its pocket surface 52 is formed as a single spherical-shaped concave surface having a radius of curvature R the center of curvature of which is the rotation center $O_0$ of the ball B. Also, the axial clearances δ of the retainer 30 according to the present embodiment and the conventional retainer 50 are both set at the same value.

As shown in FIG. 3 (a), in the case of a retainer 30 according to the present embodiment, since the first pocket surfaces 40 formed in the inner walls of the pair of pawls 36 are formed such that they have a larger radius of curvature than that of the second pocket surface 42 and are shifted by an axially shifting quantity h1 in the axial direction, on the circumferential direction C side, there is formed a relatively large lubricant collecting portion 56. On the other hand, in the case of the conventional retainer 50, since the pocket surface over the entire area thereof including the inner walls of a pair of pawls 54 is formed as a singe spherical-shaped concave surface, the lubricant collecting portion thereof in the circumferential direction C is small when compared with a retainer 30 according to the present embodiment.

Therefore, in the case of the retainer 30 according to the present embodiment, since the axial clearance δ to the diameter Da of the ball B, that is, δ/Da is set in the range of δ/Da=−0.01~0.02, not only the dynamic torque can be lowered and the noise level can be restricted, but also, on the circumferential direction C side, there is formed a relatively large lubricant collecting portion 56, thereby being able to facilitate the entrance and holding of the lubricant in the pocket 32, so that the lubricating property of the retainer 30 can be enhanced.

Also, according to the first embodiment, the inflection point heights of the first and second pocket surfaces 40, 42 are set so as to coincide with the height of the rotation center $O_0$ of the ball B in the no-load state (as shown in FIG. 2, b=0), which can facilitate the determination of an origin when designing a metal mold for molding a retainer 30 according to the present embodiment; that is, the manufacture of the metal mold can be facilitated.

Next, FIG. 4 shows a pocket 60 used in a retainer according to a second embodiment or the invention, which is different in structure from the pocket shown in FIGS. 2 and 3. In the second embodiment, parts thereof having the same structures as those shown in FIGS. 2 and 3 are given the same designations and thus the description thereof is omitted here.

The pocket surface of the pocket 60 according to the present embodiment, with the ball B stored therein, is composed of a pair of first pocket surfaces 62 formed in the inner walls of a pair of pawls 36 and a second pocket surface 64 situated between these two first pocket surfaces 62.

The second pocket surface 64 is formed as a spherical-shaped concave surface having a radius of curvature R which is shown in the above equation (1) and also the center of curvature of which is the rotation center $O_0$ of the ball B in the no-load state.

Also, in the case of the first pocket surfaces 62, the center of curvature $O_2$ thereof lies at a position which is shifted from the center of curvature $O_0$ of the second pocket surface 64 in the circumferential direction C by a dimension $h_2$ (which is hereinafter referred to as a circumferentially shifting quantity $h_2$); and thus, each of the first pocket surfaces 62 is formed as a spherical-shaped concave surface having a radius of curvature Ra with the center of curvature $O_2$ smaller than the radius of curvature R of the second pocket surface 64 (Ra<R). By the way, the above-mentioned circumferential shifting quantity $h_2$ and the radius of curvature Ra of the first pocket surface 62 are shown in the following equations (4) and (5), respectively.

$$h_2 = \frac{\delta(\delta + Da)}{2\delta + Da(1 - K)} \neq 0 \quad (4)$$

$$Ra = \delta + \frac{Da}{2} - \frac{\delta(\delta + Da)}{2\delta + Da(1 - K)} = R - h_2 \quad (5)$$

Here, in the present embodiment as well, the ratio of the axial clearance δ to the diameter Da of the ball B is set in the range of δ/Da=−0.01~0.02; and, using the value of that of the axial clearance δ to the diameter Da of the ball B in this range, the radius of curvature Ra of the first pocket surface 62, the radius of curvature K of the second pocket surface 64 and the circumferential shifting quantity $h_2$ are determined. Thanks to this, when the retainer 30 is going to move in the axial direction with respect to the ball B, the two first pocket surfaces 62 formed in the inner walls of a pair of pawls 36 and the second pocket surface 64 situated between these two first pocket surfaces 62 restrict the movement of the retainer 30 to thereby reduce a collision force between the ball B and pocket surfaces 62, 64, which can decrease the dynamic torque and thus can restrict the noise level.

Also, in the present embodiment, the two first pocket surfaces 62 respectively disposed in the inner walls of a pair of pawls 36 are formed so as to be shifted in the circumferential direction C with a smaller radius of curvature than that of the second pocket surface 64 and, therefore, similarly to the previously described first embodiment, there can be formed a relatively large lubricant collecting portion on the circumferential direction C side.

Accordingly, in the second embodiment as well, in case where the ratio of the axial clearance δ to the diameter Da of the ball B is set in the range of δ/Da=−0.01~0.02, not only the dynamic torque can be lowered and thus the noise level can be restricted, but also there is formed a relatively large lubricant collecting portion on the circumferential direction C side, which makes it easy for the lubricant to flow into and to be held in the pocket 60, thereby being able to enhance the lubricating property of the retainer.

Also, since the radius of curvature Ra of the first pocket surface 62 is set smaller than the radius of curvature R of the second pocket surface 64 (Ra<R), there can be provided an effect that the contact angle of the first pocket surface 62 with respect to the ball B, that is, the manner of embracing the ball B in the axial direction A can be set freely.

Figure 5:
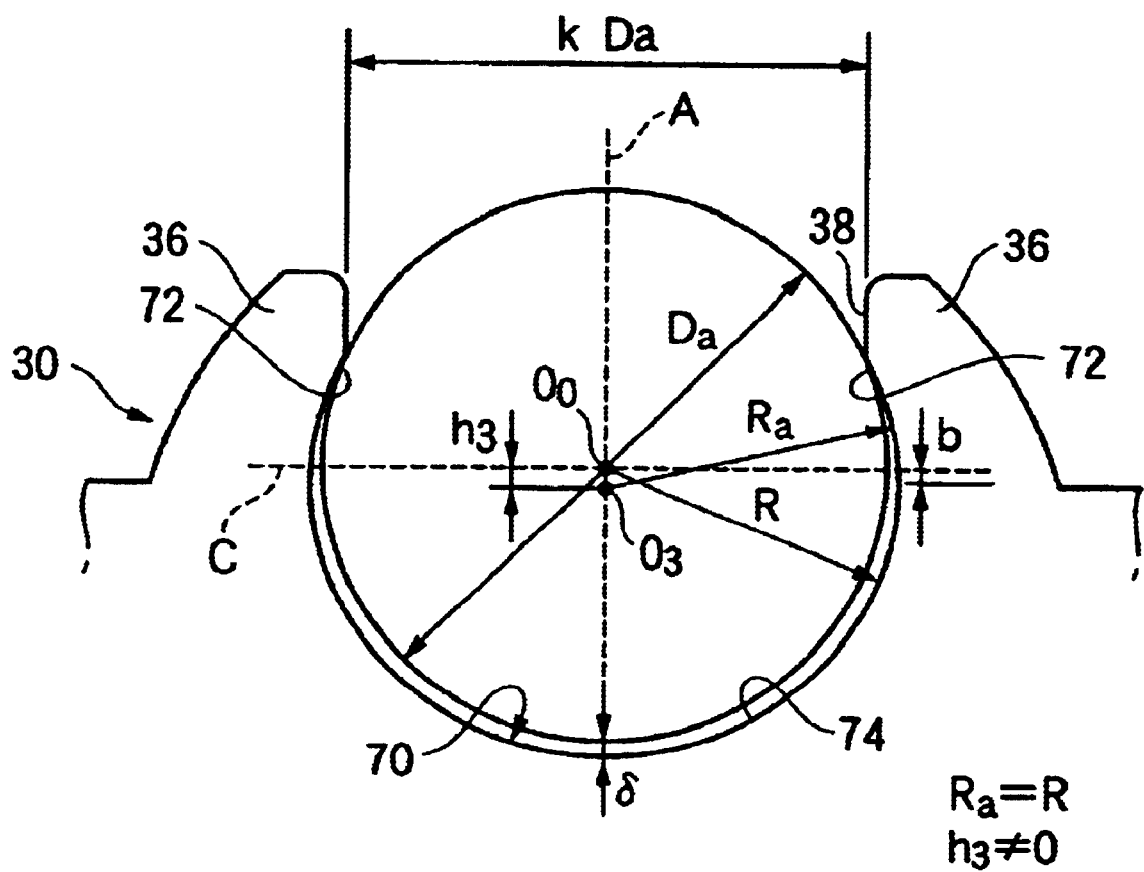
FIG. 5 is a view of the shape of a pocket used in a third embodiment according to the invention.

Next, FIG. 5 shows a pocket 70 according to a third embodiment of the invention.

The pocket surface of the pocket 70 according to the present embodiment, with the ball B stored therein, is composed of two first pocket surfaces 72 respectively formed in the inner walls of a pair of pawls 36 and a second pocket surface 74 situated between these two first pocket surfaces 72.

The second pocket surface 74 is formed as a spherical-shaped concave surface having a radius of curvature R which is shown in the above equation (4) and the center of curvature of which is the rotation center $O_0$ of the ball B in the no-load state.

Also, in the case of the first pocket surfaces 72, the center of curvature $O_3$ thereof lies at a position which is shifted from the center of curvature $O_0$ of the second pocket surface 74 in the circumferential direction C by a dimension $h_3$ (which is hereinafter referred to as a circumferentially shifting quantity $h_3$); and thus, each of the first pocket surfaces 72 is formed as a spherical-shaped concave surface having a radius of curvature Ra which is equal to the radius of curvature R of the second pocket surface 74 (Ra=R) from the center of curvature $O_3$. By the way, the above-mentioned circumferentially shifting quantity $h_3$ and the radius of curvature Ra of the first pocket surface 72 are shown in the following equations (6) and (7), respectively.

$$h_3 = \left| \pm \frac{1}{2} \left\{ \sqrt{(Da + 2\delta)^2 - (kDa)^2} \mp Da\sqrt{1 - k^2} \right\} \right| \neq 0 \quad (6)$$

-continued $$Ra = R = \delta + \frac{Da}{2} \quad (7)$$

Here, in the present embodiment as well, the ratio of the axial clearance δ to the diameter Da of the ball B is set in the range of δ/Da=−0.01~0.02; and, using the value of the ratio (δ/Da) of the axial clearance δ to the diameter Da of the ball B in this range, the radius of curvature Ra of the first pocket surface 72, the radius of curvature R of the second pocket surface 74 and the circumferentially shifting quantity $h_3$ are determined. Thanks to this, when the retainer 30 is going to move in the axial direction with respect to the ball B, the two first pocket surfaces 72 formed in the inner walls of a pair of pawls 36 and the second pocket surface 74 situated between these two first pocket surfaces 72 restrict the movement of the retainer 30 to thereby reduce a collision force between the ball B and pocket surfaces 72, 74, which can decrease the dynamic torque and thus can restrict the noise level.

Also, in the present embodiment, since the radius of curvature Ra of the first pocket surface 72 is set equal to the radius of curvature R of the second pocket surface 74 (Ra=R), the inflection point heights b of the first and second pocket surfaces 72, 74 are shifted from the rotation center $O_0$ of the ball B in the no-load state toward the opposite side to the pocket opening 38 in the axial direction A only by a dimension $h_3/2$ (b=$h_3/2$); and, therefore, when designing a metal mold, the origin can be determined easily and thus the manufacture of the metal mold can be carried out easily.

Figure 6:
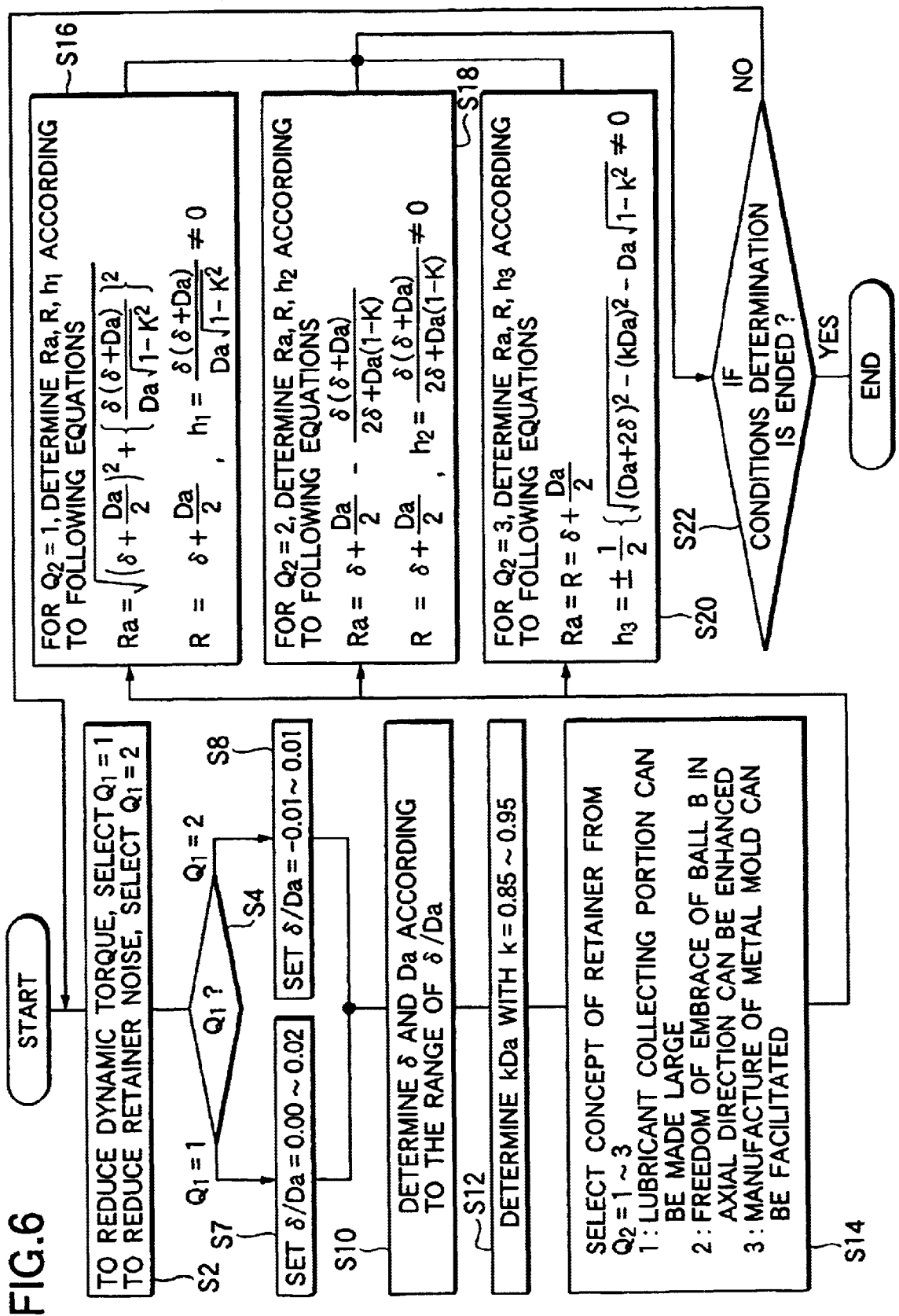
FIG. 6 is a flow chart of a procedure for determining the conditions for forming a pocket when designing a retainer according to the invention.

Next, FIG. 6 shows a flow chart of the procedure for determining the conditions for forming the pocket when designing the retainer 30.

According to this flow chart, firstly, in Step S2, in case where it is a main object to reduce the dynamic torquer $Q_1$=1 may be selected; and, in case where it is a main object to reduce the noise of the retainer, $Q_1$=2 may be selected.

Next, in Step S4, it is checked whether $Q_1$ is 1 or 2. If $Q_1$=1 is found, then the processing goes to Step S7; and, if $Q_1$=2 is found, then the processing goes to Step S8.

In Step S7, to which the processing goes if $Q_1$=1 is found, the ratio of the axial clearance δ to the diameter Da of the ball B is set in the range of δ/Da=−0.00~0.02. Also, in Step S8, to which the processing goes if $Q_1$=2 is found, the ratio of the axial clearance δ to the diameter Da of the ball B is set in the range of δ/Da=−0.01~0.01.

Next, in Step S1, in accordance with the δ/Da range that is set, the axial clearance δ and the diameter Da of the ball B are determined.

Next, in Step S12, in accordance with the constant k=0.85~0.95 and the diameter Da of the ball B, the opening width kDa of the pocket entrance 38 is determined.

Then, in Step S14, the concept to be obtained by the retainer 30 is selected from $Q_2$=1, $Q_2$=2 and $Q_2$=3.

Here, in case where $Q_2$=1 is selected in Step S14, the processing goes to Step S16, where the conditions Ra, R and $h_1$ for forming the pocket 32 (see FIG. 2) according to the above-mentioned first embodiment are determined.

Also, in case where $Q_2$=2 is selected in Step S14, the processing goes to Step S18, where the conditions Ra, K and $h_2$ for forming the pocket 60 (see FIG. 4) according to the above-mentioned second embodiment are determined.

Also, in case where $Q_2$=3 is selected in Step S14, the processing goes to Step S20, where the conditions Ra, R and $h_3$ for forming the pocket 70 (see FIG. 5) according to the above-mentioned third embodiment are determined.

After then, the processing goes from any one of Steps S16~S20 to Step S22 where the end of the determination of the pocket forming conditions is judged.

In case where the pocket forming conditions are determined according to the procedure shown in the flow chart, there is obtained a structure which has no ill effects on the manufacture of a metal mold by injection molding and on the storage of the ball B in the pocket of the retainer: that is, this structure not only can restrict the movement of the retainer in the axial direction with respect to the ball B to thereby prevent the generation of the noises in the retainer, but also can facilitate the manufacture of the retainer 30 which is enhanced in the lubricating property.

By the way, in the illustrated respective embodiments of the invention, the first pocket surfaces 40, 62, 72 and second pocket surfaces 42, 64, 74 are respectively formed as a spherical-shaped concave surface; however, according to the subject matter of the invention, this shape is not limitative. That is, the invention contains all shapes that can be defined by the radii of curvature R, Ra which, in a state where the inner walls of the pawls 36 are in point contact or in surface contact with the ball B and also in a state where the bottom surface of the pocket is in point contact or in surface contact with the ball B, pass through these contact positions.

Also, in the respective embodiments of the invention, description has been given of a retainer for use in a deep groove ball bearing. However, the invention can also apply to a retainer for use in all kinds of rolling bearings.

Further, since the moving quantity of the retainer with respect to the rolling element or ball is restricted, the invention can apply not only to a retainer structured such that, as in a conventional retainer, the pocket PCD of the retainer is shifted in the radial direction with respect to the PCD of a bearing but also to a retainer structured such that, as in a retainer disclosed in JP-A-10-82424, the pocket inner and outer peripheral edge portions of the retainer are chamfered.

Thanks to this, according to the invention, there can be provided a bearing which is greatly enhanced not only in the restriction of the moving quantity of the retainer with respect to the rolling element but also in the prevention of removal of the lubricant sticking to the rolling element, thereby being able to prevent the generation of the noises in the retainer and enhance the acoustic life of the bearing.

As has been described heretofore, in a retainer for a rolling bearing according to the invention, since the ratio of the axial clearance δ, which is formed between the rolling surface of the rolling element in the axial direction and pocket surface, to the diameter Da of the ball B is set in the range of δ/Da=−0.01~0.02, the inside pocket surface of the opening and the pocket surface of the bottom restrict the movement of the retainer in the axial direction to thereby be able not only to reduce a collision force between the rolling element and pocket surface but also to obtain a sufficient lubricant collecting portion, so that the dynamic torque can be reduced and the noise level can be controlled.

Also, in case where the pocket surface is composed of a pair of first pocket surfaces respectively formed on the inside of the opening and a second pocket surface formed between these two first pocket surfaces and the center of the radius of curvature of each first pocket surface is shifted in the above axial direction or in the circumferential direction with respect to the center of the radius of curvature of the second pocket surface substantially coincident with the rotation center of the rolling element, when the rolling element is contacted with the inner wall of the opening, in the circumferential direction between the rolling element and the first pocket surfaces, there is formed a relatively large lubricant collecting portion, which not only can reduce the dynamic torque and can control the noise level but also can enhance the lubricating property.

What is claimed is:

1. A retainer for a rolling bearing, formed in a circular-ring shape as a whole, comprising:

a plurality of pockets formed at a plurality of portions in the circumferential direction thereof for storing and holding rolling elements with the pocket surfaces of said pockets; and, a plurality of openings respectively formed on one side of the axial direction of said respective pockets, each of said openings having an opening width smaller than a diameter of said rolling element, wherein a ratio $\delta/Da$ of an axial clearance $\delta$, which is formed between the rolling surface of said rolling element in said axial direction and said pocket surface, to the diameter Da of said rolling element is set in the range from −0.01 to 0.02.

2. The retainer for a rolling bearing as set forth in claim 1, wherein said pocket surface comprises a pair of first pocket surfaces respectively formed inside said opening and a second pocket surface formed between said two first pocket surfaces, and the center of the radius of curvature of said first pocket surface is shifted in said axial direction or in said circumferential direction with respect to the center of the radius of curvature of said second pocket surface substantially coincident with the rotation center of said rolling element.

3. The retainer for a rolling bearing as set forth in claim 2, wherein the radius of curvature of said first pocket surface is set at a value larger than the radius of curvature of said second pocket surface, the center of curvature of said radius of curvature of said first pocket surface is shifted from the center of curvature of said radius of curvature of said second pocket surface toward the opposite side to said opening in said axial direction, and the inflection point heights of said first and second pocket surfaces are set so as to coincide with each other.

4. The retainer for a rolling bearing as set forth in claim 2, wherein the radius of curvature of said first pocket surface is set at a value smaller than the radius of curvature of said second pocket surface, the center of curvature of said radius of curvature of said first pocket surface is shifted in said circumferential direction with respect to the center of curvature of said radius of curvature of said second pocket surface, and the inflection point heights of said first and second pocket surfaces are set so as to coincide with each other.

5. The retainer for a rolling bearing as set forth in claim 2, wherein the radius of curvature of said first pocket surface is set at a value equal to the radius of curvature of said second pocket surface, the center of curvature of said radius of curvature of said first pocket surface is shifted from the center of curvature of said radius of curvature of said second pocket surface toward the opposite side to said opening in said axial direction, and the inflection point heights of said first and second pocket surfaces are set so as to coincide with each other.

6. The retainer for a rolling bearing as set forth in claim 1, wherein said retainer for a rolling bearing is a crown-shaped member formed of synthetic resin by injection molding.

7. A retainer for a rolling bearing, formed in a circular-ring shape as a whole, comprising:

a plurality of pockets formed at a plurality of portions in the circumferential direction thereof for storing and holding rolling elements with the pocket surfaces of said pockets; and a plurality of openings respectively formed on one side of the axial direction of said respective pockets, each of said openings having an opening width smaller than a diameter of said rolling element, wherein a ratio $\delta/Da$ of an axial clearance $\delta$, which is formed between the rolling surface of said rolling element in said axial direction and said pocket surface, to the diameter Da of said rolling element is set in the range from −0.01 to 0.02, and further wherein each of said pocket surfaces comprises a pair of first pocket surfaces respectively formed inside said opening and a second pocket surface formed between said two first pocket surfaces, and the center of the radius of curvature of said first pocket surface is shifted in said axial direction or in said circumferential direction with respect to the center of the radius of curvature of said second pocket surface substantially coincident with the rotation center of said rolling element.

8. The retainer for a rolling bearing as set forth in claim 7, wherein the radius of curvature of said first pocket surface is set at a value larger than the radius of curvature of said second pocket surface, the center of curvature of said radius of curvature of said first pocket surface is shifted from the center of curvature of said radius of curvature of said second pocket surface toward the opposite side to said opening in said axial direction, and the inflection point heights of said first and second pocket surfaces are set so as to coincide with each other.

9. The retainer for a rolling bearing as set forth in claim 7, wherein the radius of curvature of said first pocket surface is set at a value smaller than the radius of curvature of said second pocket surface, the center of curvature of said radius of curvature of said first pocket surface is shifted in said circumferential direction with respect to the center of curvature of said radius of curvature of said second pocket surface, and the inflection point heights of said first and second pocket surfaces are set so as to coincide with each other.

10. The retainer for a rolling bearing as set forth in claim 7, wherein the radius of curvature of said first pocket surface is set at a value equal to the radius of curvature of said second pocket surface, the center of curvature of said radius of curvature of said first pocket surface is shifted from the center of curvature of said radius of curvature of said second pocket surface toward the opposite side to said opening in said axial direction, and the inflection point heights of said first and second pocket surfaces are set so as to coincide with each other.

* * * * *